United States Patent [19]

Khattab et al.

[11] 4,101,502

[45] Jul. 18, 1978

[54] INTERPOLYMERS OF POLY (BUTYLENE TEREPHTHALATE)

[75] Inventors: Ghazi Khattab, Succasunna; Gerard P. Naviello, Jersey City, both of N.J.

[73] Assignee: GAF Corporation, New York, N.Y.

[21] Appl. No.: 783,796

[22] Filed: Apr. 1, 1977

[51] Int. Cl.$^2$ .............................................. C08K 7/14
[52] U.S. Cl. .................................. 260/40 R; 260/873; 526/54; 528/309
[58] Field of Search ................. 260/75 UA, 873, 40 R

[56] References Cited

U.S. PATENT DOCUMENTS

| | | | |
|---|---|---|---|
| 2,980,649 | 4/1961 | Caldwell et al. | 260/75 UA |
| 3,937,757 | 2/1976 | Seydl et al. | 260/873 |
| 4,013,613 | 3/1977 | Abolins et al. | 260/40 R |

*Primary Examiner*—Sandra M. Person
*Attorney, Agent, or Firm*—Walter C. Kehm; Joshua J. Ward

[57] ABSTRACT

Compositions of matter comprising interpolymers of poly (butylene terephthalate) with ethylene/vinyl acetate copolymer, polyethylene or polypropylene and reinforced with between about 2 and about 60 wt. % glass fibers.

7 Claims, No Drawings

INTERPOLYMERS OF POLY (BUTYLENE TEREPHTHALATE)

BACKGROUND OF THE INVENTION

The manufacture and use of poly (butylene terephthalate) (PBT) polymer containing glass fiber as a reinforcing filler is well known and is described for instance in U.S. Pat. No. 3,814,725. Such reinforced polymers are widely used as molding resins for making various products. While the impact resistance of products molded from glass reinforced PBT is significantly better than that of many products made from other molding compositions, further improvement is desirable.

SUMMARY OF THE INVENTION

It is an object of the present invention to provide improved compositions of matter suitable for use as molding resins. The composition of matter of the invention comprises blends of glass fibers and an interpolymer of poly (butylene terephthalate) (PBT) with ethylene/vinyl acetate copolymer, polyethylene or polypropylene. The compositions comprise between about 2 and about 60 wt. % glass fibers and between about 40 and about 98 wt. % of the interpolymer.

DETAILED DESCRIPTION OF THE INVENTION

As mentioned above, the compositions of the invention comprise between about 2 and about 60 wt. % glass fibers and between about 40 and about 98 wt. % of an interpolymer of PBT with ethylene/vinyl acetate copolymer, polyethylene, or polypropylene. Such compositions have been found to have unexpectedly high impact strength as compared with the conventional glass reinforced PBT. This is especially surprising since unreinforced blends of PBT with ethylene/vinyl acetate copolymer, polyethylene, or polypropylene do not have suitable physical properties for use as molding resins.

Composition of the invention in which in PBT is polymerized with ethylene/vinyl acetate copolymer are block polymers and may be prepared by incorporating the ethylene/vinyl acetate copolymer into the materials used to form the PBT. Alternatively, the PBT may be formed first and then reacted with ethylene/vinyl acetate copolymer to obtain the desired block polymer. When ethylene/vinyl acetate copolymer is reacted with PBT rather than added during the formation of the PBT, this is preferably accomplished by adding the ethylene/vinyl acetate copolymer to PBT immediately following it's manufacture as indicated by the time the initial reactants reach an appropriate intrinsic viscosity, e.g. between about 0.6 and about 1.5 deciliters per gram (dl/g) in O-chlorophenol at 25° C. Block polymers of PBT and ethylene/vinyl acetate copolymer used in compositions of the invention preferably contain between about 50 and about 98 wt. % PBT.

While a wide range of ethylene/vinyl acetate copolymers may be used in forming the composition of the invention, those containing between about 10 and about 30 wt. % vinyl acetate portion and having number average molecular weights between about 1000 and about 5000 are preferred.

The PBT portion of the composition of the invention preferably has an intrinsic viscosity between about 0.2 and about 1.2 and may be formed in a conventional manner by condensation of 1,4-butanediol with terephthalic acid or a dialkyl ester of terephthalic acid with the use of dimethyl terephthalate being preferred. Suitable reaction conditions for the preparation of PBT are well known in the art and frequently include reaction of the starting materials for a time between about 1 and about 8 hours at a temperature at between about 240° and about 270° C under pressures ranging from atmospheric pressure to preferred vacuums of between about 0.1 and about 2 millimeters of mercury.

In the preparation of the PBT component of the invention, the use of an esterification catalyst is preferred but not essential. Where used, catalyst is present in minor amounts such as between about 0.001 and about 0.01 wt. % based on total diol. Suitable catalysts include for instance tetraisopropyl titanate (a preferred catalyst) as well as the various conventional esterification catalysts such as those referred to in U.S. Pat. No. 2,465,319, the disclosure of which is incorporated herein by reference.

Dialkyl esters of terephthalic acid which may be used in preparing PBT portions of compositions of the invention preferably contain alkyl radicals having from 1 to about 7 carbon atoms and are preferably reacted with at least equimolar proportions of the 1,4-butanediol. The use of either excess amounts of diol or esterification catalyst as described above or both is preferred in order to expedite the initial transesterification of the reactants.

Where the PBT interpolymer component of the composition of the invention is a copolymer of PBT with polyethylene or polypropylene, such interpolymer component is a graft copolymer formed by adding polyethylene or polypropylene to the PBT after manufacture of the PBT. This is accomplished by conventional means such as mixing, extrusions, etc. In order to insure polymerization of the polyethylene or polypropylene onto the PBT, minor amounts such as about 0.1 to about 3 wt. % based on PBT of at least partially unsaturated material such as 1,4-butenediol are required. Materials other than 1,4-butenediol suitable for this purpose include for instance 3-hexene-2,5-diol. Such materials when used as initial reactants in forming the PBT provide the necessary unsaturation for grafting of the polyethylene or polypropylene onto the PBT. As mentioned, the grafting operation may be conveniently carried out in conventional mixing and extruding equipment.

Polyethylene used in forming PBT/polyethylene graft polymers in accordance with the invention preferably has a number average molecular weight between about 24,000 and about 290,000 and an intrinsic viscosity between about 0.7 and about 1.7 in decalin at 135° C. PBT/polyethylene or PBT/polypropylene graft polymers preferably comprise between about 60 and about 98 wt. % PBT. Molecular weights and intrinsic viscosities of polypropylene used are preferably the same as for polyethylene.

Glass fibers used in the composition of the invention are, as mentioned above, used in amounts between 2 and about 60 wt. % of such composition. Suitable glass fibers include either chopped or continuous fibers with fibers between about 5 and about 15μ diameter and between about ⅛ and about ½ inch length being preferred. Coupling agents of suitable chemical compositions such as beta (3, 4-epoxycyclohexyl) ethyltrimethylsilane or gamma-glycidoxypropyltrimethylsilane may be used in order to enhance the adhesion between glass fibers and the interpolymers. While broad ranges of proportions of fibers and interpolymers can be used as described above, preferred embodiments of the invention involve the use of between about 15 and about 50 wt. % glass fibers with the remainder of the composition consisting essentially of copolymer.

Glass fibers may be compounded with the copolymer to form compositions of the invention in any suitable manner such as with conventional mechanical mixing and extruding equipment. Pelletizing into pellets between about 1/16 and about ¼ inch diameter is preferred. Typical extruding conditions include for instance temperatures between about 250° and about 275° C.

The following examples are intended to illustrate the practice and advantages of the invention without limiting the same.

EXAMPLE 1

In this example the physical properties of blends of PBT with polyethylene and ethylene/vinyl acetate copolymer (EVA) were evaluated. As indicated in Table 1 below, the physical properties of PBT blends with these materials were inferior, thus indicating the poor compatibility of blends of PBT with EVA or polyethylene.

Table 1

| Composition | PBT (wt. % in blend) | Notched Blends Izod Impact | Yields Str. (PSI) | Elongation (%) |
| --- | --- | --- | --- | --- |
| PBT (IV=0.9 dl/g) | 100 | (ft. lb. in notch) | 8000 | 203 |
| EVA[1] | 0 | | 3000 | 716 |
| PBT/EVA[1] | 75 | | 5200 | 38 |
| PBT/EVA[1] | 85 | | 5600 | 26 |
| PBT | 100 | 0.7 | 8427 | 80 |
| Polyethylene[2] | 0 | 7.18 | 4182 | 91 |
| PBT/PE[2] | 50 | 0.34 | 5240 | 5.0 |

[1]15 % vinyl acetate. Number average molecular wt. 3000–3500.
[2]Intrinsic viscosity of 1.62 in decalin at 135° C.

EXAMPLE 2

A block polymer of PBT with ethylene/vinyl acetate copolymer suitable for use in compositions of the invention was prepared from the following starting ingredients.

| Ingredient | Amount |
| --- | --- |
| 1,4-Butanediol | 1088g. |
| Dimethyl terephthalate | 1800g. |
| Tetraisopropyl titanate | 1.08g. in 10 ml. xylene |
| EVA (15% vinyl acetate) | 100g. |

The polymer was prepared by introducing the above ingredients into a 1 gallon stainless steel reactor equipped with a mechanical stirrer, a bottom discharge valve, vacuum and heating controls, a condenser and a receiver. The reactor was closed and the mixture heated while stirring under a vacuum of 200 millimeters of mercury. At 130° – 140° C (after 30 min.) distillation of methanol began. After 75 min. elapsed time, the temperature of the reaction mixture had reached 200° C and was maintained at this level for an additional 30 min. The receiver was then replaced and the pressure in the reactor reduced to 0.1–1.0 millimeter of mercury over a period of 5 to 10 min. The temperature was increased to 250° C over a period of 30 min. and heating and stirring under these conditions were continued for additional two hours. During this period the melt viscosity increased gradually as determined by increase in the electrical current required by the stirring motor. When an appropriate intrinsic viscosity of about 0.7 to about 0.9 dl/g in O-chlorophenol was obtained, the vacuum was broken off by introducing nitrogen into the system and the product was discharged under a pressure of 20–30 PSI as a viscous fluid. 2065–2140 grams of white solid product was obtained representing 96.5–99.5 percent yield based on the terephthalate. The physical properties of this product are given in Table 2 below.

EXAMPLE 3

In this example another block polymer of PBT with ethylene/vinyl acetate copolymer suitable for use as the interpolymer of the composition of the invention was produced. The ingredients used were the same used as in example 2 and the manufacturing process was generally the same except that in manufacturing the block polymer of this example, the ethylene/vinyl acetate copolymer was not included in the original reactants charged to the reactor. Instead, the polymerization reaction was initiated and allowed to continue without the EVA until the appropriate intrinsic viscosity of 0.9 dl/g in O-chlorophenol was obtained. The vacuum of the system was then broken by introducing nitrogen and the EVA was added to the reactor. The reactor was again closed and heated with stirring under vacuum in a manner similar to that of example 2. The melt viscosity dropped initially as the result of the EVA addition but then continued to increase. When the desired intrinsic viscosity of 0.8–0.9 dl/g was obtained the product was discharged from the reactor as in example 2. In this example 2035–2133 grams of white solid product was obtained representing 95–99.6 percent yield based on terephthalate. The physical properties of this product are summarized in Table 2 below.

EXAMPLE 4

In this example PBT was produced in a manner identical with that of example 2 except that no ethylene/vinyl acetate copolymer was used in this example. 1970 grams of a white solid product representing a 96.6 percent yield was obtained. The physical properties of this product are summarized in Table 2 below.

EXAMPLE 5

This example illustrates the production of a graft polymer of PBT with polyethylene suitable for use in forming composition of the invention. In this example the PBT was first formed as described immediately below and polyethylene then graft polymerized onto the PBT. The starting ingedients for PBT manufacture were:

| Ingredient | Amount |
| --- | --- |
| 1,4-Butanediol | 1059.5g. |
| 1,4-Butenediol | 27.5g. |
| Dimethyl terephthalate | 1799g. |

| Ingredient | Amount |
| --- | --- |
| Tetraisopropyl Titanate | 1.08 in 10 ml xylene |

In forming PBT from the above ingredients a stainless steel reactor as described in example 2 was used. All of the ingredients were added and the polymerization reaction carried out generally as described in example 2. 1905–1971 grams of a white semi-crystalline copolymer were obtained, representing 97 percent yield based on terephthalate and having an intrinsic viscosity of 0.90 in O-chlorophenol. This product was processed in a conventional manner to form granulated resin.

To 950 grams of granulated resin obtained as described immediately above, 50 grams of powdered polyethylene having an intrinsic viscosity of 1.62 dl/g in decalin at 135° C were added together with 2.0 grams of 2,5-dihydroperoxy-2,5-dimethylhexane. This mixture was then blended mechanically and extruded into strands using a ¾ inch laboratory extruder operated at a screw speed of 20 rpm at 480° F. The strands were then cut into pellets. The physical properties of the resulting graft copolymer of PBT and polyethylene are summarized in Table 2 below.

Table 2

| Material of Example No. | Physical Properties of Polymers of Examples 2–5 | | | |
| --- | --- | --- | --- | --- |
| | density[1] g/cc. | Intrinsic viscosity[2] dl/g. | M.p.[3] C | onset of thermal[4] instability, C. |
| 2 | 1.29 | 0.81 | 210 & 218 | 355 |
| 3 | 1.29 | 0.96 | 220–225 | 355 |
| 4 | 1.32 | 0.82 | 220–225 | 355 |
| 5 | 1.29 | 0.96 | 125 & 215 | 350 |

[1] density was determined according to ASTM D-792
[2] Measured in O-chlorophenol at 25° C.
[3] By Differential Thermal Analysis at a heating rate of 20° C/minute under nitrogen atmosphere.
[4] By Thermogravimetric analysis at a heating rate of 20° C/minute under nitrogen atmosphere.

EXAMPLE 6

This example illustrates production of compositions of the invention and the use of such compositions in a conventional injection molding process. For this example, the products of examples 2–5 were compounded with fiber glass to form compositions suitable for injection molding. This was accomplished in each case by mechanically mixing fiber glass strands chopped to 3/16ths inch with granulated resin prepared according to each of the examples 2–5 to form a composition containing 30% glass fiber. These mixtures were then fed into a conventional extruder operated at 50 rpm at a temperature ranging from 265° C in the coolest zone to 275° C in the hottest zone. Melt temperature was as follows:

| Product of Example | Temp. (° C) |
| --- | --- |
| 2 | 268 |
| 3 | 250 |
| 4 | 259 |
| 5 | 267 |

The extruded strands were then water quenched, pelletized into ⅛th inch pellets and dried at 120° C for 4 hours.

EXAMPLE 7

In this example the molding compositions from example 6 were injection molded to form test specimens (⅛ inch Flexural and Tensile bars, ASTM D790 and D638, respectively) using molding conditions as shown in Table 4. The resulting tests specimens were then subjected to standard physical testing with the results shown in Table 5.

Table 4

| | Molding Conditions | | | |
| --- | --- | --- | --- | --- |
| | Example 1 Material | Example 2 Material | Example 3 Material | Example 4 Material |
| Mold Temperature, ° F | 108 | 108 | 108 | 108 |
| Barrel Temperature, ° F | | | | |
| Front | 450 | 480 | 480 | 480 |
| Rear | 450 | 480 | 480 | 480 |
| Nozzle Temperature, ° F | 450 | 480 | 480 | 480 |
| Injection cycle, sec. | 15 | 15 | 15 | 15 |
| Hold cycle, sec. | 25 | 45 | 30 | 25 |
| Injection speed, sec. | 8 | 7 | 7 | 7 |
| Pressure, psi | 1260 | 1160 | 1040 | 1200 |
| Stroke travel, In. | 4-9/16 | 4-3/4 | 4-7/8 | 3-3/4 |
| Average shot weight, g. | 95.7 | 96.5 | 101.3 | 99.7 |

Table 5

| | Properties of PBT Polymers containing 30% Glass | | | |
| --- | --- | --- | --- | --- |
| | ASTM | Example 2 Material | Example 3 Material | Example 4 Material | Example 5 Material |
| Izod Impact, notched ft.lb/in, notch | D-256 | 2.30 | 2.61 | 1.88 | 2.22 |
| Izod Impact, unnotched ft.lb/in. | D-256 | 12.04 | 12.83 | 10.84 | 11.46 |
| Yield Tensile Strength, psi | D-638 | 17,664 | 19,460 | 19,396 | 19,212 |
| Elongation at Break, % | D-638 | 4.5 | 5.0 | 5.0 | 5.0 |

Table 5-continued

| | | Properties of PBT Polymers containing 30% Glass | | | |
|---|---|---|---|---|---|
| | ASTM | Example 2 Material | Example 3 Material | Example 4 Material | Example 5 Material |
| Fluxural Strength, psi | D-790 | 27,727 | 28,295 | 29,152 | 28,656 |
| Fluxural Modulus, psi | D-790 | 1,195,000 | 1,236,000 | 1,195,000 | 1,275,000 |
| Heat Distortion Temperature ° C at 264 psi | D-648 | 206 | 213 | 208 | 210 |

It is apparent from the results of the physical testing reported in Table 5 that compositions of the invention represented by examples 2, 3 and 5 possessed unexpectedly superior physical characteristics, especially with regards to the notched Izod impact test, as compared with the physical characteristics of the composition using material of example 4 (i.e., straight PBT as opposed to the interpolymers of the compositions of the invention). The improvement was obtained without detriment to other physical properties. On the contrary, material using the interpolymer of example 3 representing a preferred embodiment of the invention showed improved physical characteristics with respect to all of the characteristics tested.

While the invention has been described above with respect to preferred embodiments thereof, it will be understood that various changes and modifications may be made without departing from the spirit and scope of the invention.

What is claimed is:

1. A composition of matter comprising a blend of:
   a. between about 2 and about 60 wt% glass fibers, and
   b. between about 40 and 98 wt% of a graft copolymer of poly(butylene terephthalate) containing between about 0.1 wt% and about 3 wt% based on poly(butylene terephthalate) of 1,4-butenediol or 3-hexene-2,5-diol with polyethylene or polypropylene.

2. A composition according to claim 1 in which the graft copolymer is a graft copolymer of poly(butylene terephthalate) with polyethylene.

3. A composition according to claim 1 in which the graft copolymer is a graft copolymer of poly(butylene terephthalate) with polypropylene.

4. A composition according to claim 1 in which the poly(butylene terephthalate) contains between about 0.1 wt% and about 3 wt% 3-hexene-2,5-diol.

5. A composition according to claim 2 in which the polyethylene has a number average molecular weight of between about 24,000 and about 290,000.

6. A composition according to claim 1 in which the poly (butylene terephthalate) has an intrinsic viscosity between 0.2 and about 1.5 dl/g in O-chlorophenol at 25° C.

7. A composition according to claim 1 in which the graft copolymer is produced by first forming poly (butylene terephthalate) and then polymerizing the poly (butylene terephthalate) with, polyethylene or polypropylene.

* * * * *